April 12, 1949.  W. H. SCHECHTER ET AL  2,466,743
MERCURY TRAP FOR MERCURY TYPE VACUUM GAUGES
Filed Sept. 5, 1944
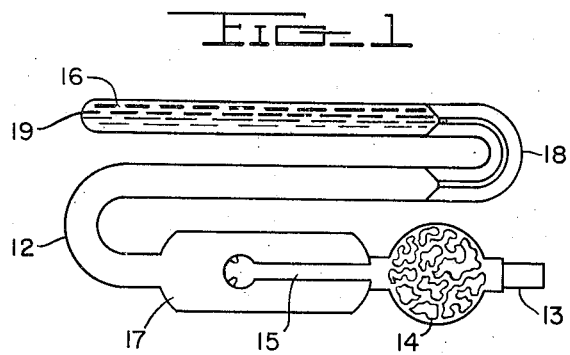
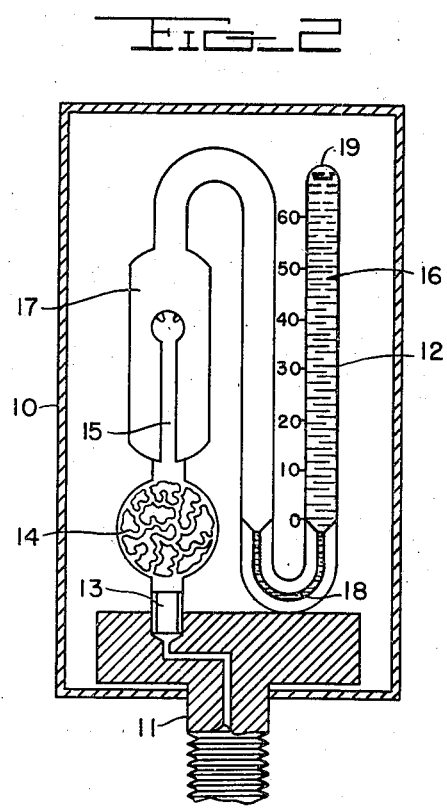
Inventor
ROMAN R. MILLER
WILLIAM H. SCHECHTER
By
Attorney Patented Apr. 12, 1949

2,466,743

UNITED STATES PATENT OFFICE 2,466,743

MERCURY TRAP FOR MERCURY TYPE VACUUM GAUGES

William H. Schechter, Washington, D. C., and Roman R. Miller, Silver Spring, Md.

Application September 5, 1944, Serial No. 552,785

1 Claim. (Cl. 73—401)

(Granted under the act of March 3, 1883, as amended April 30, 1928; 370 O. G. 757)

Our invention relates to pressure measuring gauges and particularly to mercury traps for mercury type gauges for measuring low pressures of the order of a few inches of mercury.

Frequently occasions arise when it is desired to measure a pressure within a space which has been evacuated to an absolute pressure of a few millimeters of mercury. There is no pressure gauge usable in the range of pressures up to about one pound per square inch absolute, which corresponds to about 2.0 inches of mercury. In the past it has been customary to use small mercury manometer to make pressure measurements in the low ranges. These have suffered the distinct disadvantages that the mercury was frequently spilled and that sudden release of the vacuum often resulted in blowing out the top of the manometer.

In many applications aboard Naval vessels today, spaces evacuated to pressures of a few millimeters of mercury and freed of water vapor are essential. Notable among these is the submarine periscope. The tube must be free of water vapor for at least two reasons, namely, to avoid condensation of moisture on optical surfaces and, second, to avoid humid corrosion of metallic parts in the tube.

It has been customary to dry out the periscope tube by blowing warm dry air or nitrogen through it to flush out moisture. Recently it has been found to be more convenient and efficacious to "pump down" the tube. By attaching to the tube a manometer reading in the range of a few millimeters of mercury, it is possible to pump down the tube and note from the behavior of the manometer the precise moment of the disappearance of the last of the water in the tube.

Another application in which a reasonably precise, low range manometer is needed is in the making of gas-filled tubes, ionization chambers and discharge type radiation detectors generally. In preparing these types of tubes, the envelopes are pumped down to a very high vacuum and then refilled to the required pressure with the gas it is desired to use. In cases such as these it is essential that the tubes be filled with only the gas needed therein and contain no foreign vapor.

Use of mercury manometers for purposes like those outlined above entails certain difficulties for manometers are made of glass and hence inherently incapable of being handled roughly. Furthermore, mercury possesses an appreciable vapor pressure at room temperatures and entrance of the slightest trace of mercury vapor into the evacuated space can often cause profound aberrations in the behavior of the instrument serviced.

It is an object of our invention to convert a mercury manometer type vacuum gauge to a "tool box" type tool.

It is a second object of our invention to provide a mercury type vacuum gauge not subject to loss of manometric liquid by sudden release or sudden application of vacuum.

It is a third object of our invention to provide a mercury trap for a mercury type vacuum gauge which will not pass any liquid mercury or mercury vapor into the space being evacuated, and at the same time guard against saturation of the mercury-vapor trapping material.

Other objects and advantages of our invention will in part be obvious and in part appear hereinafter.

Our invention comprises the features of construction, combination of elements, and arrangement of parts which will be exemplified in the construction hereinafter set forth and the scope of the invention will be indicated in the claims.

In the accompanying drawings, illustrating one embodiment of this invention in which like reference characters refer to like parts, Fig. 1 is a view of the assembled vacuum gauge as it appears without its casing;

Fig. 2 is a detail of Fig. 1 showing the interrelationship of the several parts of the assembled apparatus.

Referring to Figs. 1 and 2, 10 is a metal case secured to a supporting block 11 having a threaded outlet connecting nipple projecting from its lower surface as shown, for connection to a source of vacuum. The case is adapted to receive the various working parts including the manometer unit generally indicated as 12. The manometer tube 12 is comprised of the usual U-tube structure with one vertical leg closed at the top for containing the mercury column and the other open at top for affording connection with a source of vacuum. Sealed to a tube 13 of material such as "Invar" or "Kovar," to which glass can be sealed, is the outlet tube of a chamber 14 for trapping mercury vapor, the tube 13 being cemented into the block 11. A channel in the block 11 connects the tube 13 with the threaded outlet nipple as shown. The chamber 14 has an inlet stand-tube 15, which has a perforated bulbous end to allow an air path through to the mercury column 16. Stand tube 15 opens into chamber 17 which latter is for trapping liquid mercury, the inlet stand tube extending into the chamber 17 above the bottom and preferably at such a height that the perforations in its bulbous end will stand above the level to which the mercury in column 16 could fill the space. Between the mercury column 16 and the vertical leg of the U-tube connecting the U-tube with the liquid-mercury trap chamber is a restricted passage 18 which limits the rate of flow of mercury from one side of the manometer to the other so that there is no danger of its taking the end 19 off the tube when the vacuum is suddenly released.

If any liquid mercury gets over into the chamber 17, it is trapped there and can go no farther. Chamber 14 is filled with metal shavings not readily oxidized yet capable of forming an amalgam with mercury and thus constitutes a "mercury vapor trap" beyond which mercury vapor cannot go. If mercury vapor were to go beyond this point, it could react with the nipple-to-block joint or solder or enter the evacuated space to create difficulty there.

The "mercury vapor trap" should be some absorbent for mercury vapor such as shavings of a metal which forms an amalgam with the mercury which amalgam has no appreciable mercury vapor pressure. We have found the following metals typical of those suitable, silver, gold, and cadmium.

These metals are valuable for this purpose because readily they form mercury-rich amalgams, which have no appreciable mercury vapor pressure and in the pure state they are substantially unoxidizable.

The entire manometer unit is carefully cemented into the case to cushion it against jolts or other mistreatment. It is well to use a resilient cement such as neoprene elastic cement or some other synthetic rubber base.

On the back of the case there is mounted a scale appropriately graduated so that the differences in level of the mercury column can be read. When the threaded connecting nipple on the block 11 is applied to an evacuated space, and the pressure within the space drops within the range covered by the manometer, mercury rises in one arm and drops in the other arm or tube 12. The absolute pressure within the evacuated space is the difference between the heights of the two columns:

In use, it is most convenient to mount the manometer in a vertical position in order to make it direct reading. However, this is not absolutely essential for if it is inclined and the angle of inclination known, differences in level of the mercury arms are computable.

Although our invention finds its greatest usefulness as a small gauge useful for measuring small absolute pressures, it can be made larger to measure absolute pressures as high as atmospheric or higher. In such cases, however, the gauge loses the advantage of convenient size.

We have described our invention as a mercury filled manometer. Naturally this liquid can be replaced with others in the event a more sensitive device is desired. In such cases the construction of the manometer unit 12 remains the same, but the absorbent for the manometric fluid is changed. For example, dibutyl phthalate could be used in the manometer as the manometric fluid with silica gel or charcoal as the vapor absorbent.

The advantages of our invention can be summarized as follows:

It is a compact, rugged tool which can stand treatment as rough as that given any mechanical gauge, that is to say, it can be stored in a tool box with other hand tools;

It is small, compact and capable of giving direct readings to one half millimeter and, when used in an inclined position, more precise readings;

Danger of breakage by sudden rush of mercury from one side to the other is substantially eliminated;

Danger of entry of mercury vapor into the evacuated space is eliminated by the mercury vapor absorbent.

Since certain changes may be made in the above construction and different embodiments of the invention could be made without departing from the scope thereof, it is intended that all matter contained in the above description or shown in the accompanying drawings shall be interpreted as illustrative and not in a limiting sense.

The invention described herein may be manufactured and used by or for the Government of the United States of America for governmental purposes without the payment of any royalties thereon or therefor.

Having described our invention what we wish to claim as new and secure by Letters Patent is:

A mercury and vapor trap for use with a mercury U-tube type vacuum gauge comprising a chamber for trapping liquid mercury adapted for communication with one leg of a U-tube, an inlet tube having a bulbous perforated end extending into said chamber above the bottom thereof, a second chamber containing metal shavings capable of forming a mercury amalgam communicating with said inlet tube at the end opposite the perforated end for trapping mercury vapor, said second chamber having a nipple for connection to a source of vacuum.

WILLIAM H. SCHECHTER.
ROMAN R. MILLER.

REFERENCES CITED

The following references are of record in the file of this patent:

UNITED STATES PATENTS

| Number | Name | Date |
|---|---|---|
| 1,535,157 | Hughes et al. | Apr. 28, 1925 |
| 1,983,297 | Lawrence | Dec. 4, 1934 |
| 2,111,221 | Mitchell | Mar. 15, 1938 |

FOREIGN PATENTS

| Number | Country | Date |
|---|---|---|
| 3,747 | Great Britain | Mar. 9, 1915 |
| 6,938 | Great Britain | Mar. 20, 1911 |
| 125,371 | Switzerland | Apr. 16, 1928 |